United States Patent [19]

Kusuda

[11] Patent Number: 4,723,068
[45] Date of Patent: Feb. 2, 1988

[54] ELECTRIC POWER CONTROL DEVICE IN AN AUTOMATIC TEMPERATURE ADJUSTING APPARATUS

[75] Inventor: Tatsufumi Kusuda, Kyoto, Japan

[73] Assignee: Dainippon Screen Mfg. Co., Ltd., Japan

[21] Appl. No.: 833,082

[22] Filed: Feb. 24, 1986

[30] Foreign Application Priority Data

Apr. 17, 1985 [JP] Japan .................. 60-56172[U]

[51] Int. Cl.$^4$ .................................. H05B 1/02
[52] U.S. Cl. .................... 219/486; 219/483; 219/508; 219/494; 307/40; 323/319
[58] Field of Search .............. 219/483, 508, 486, 484, 219/501, 497, 499, 308, 309, 330, 331, 494, 497; 323/319, 235, 236; 307/38-41

[56] References Cited

U.S. PATENT DOCUMENTS

| 4,348,582 | 7/1982 | Budek | 219/486 |
| 4,404,461 | 9/1983 | Sitek et al. | 219/492 |
| 4,511,791 | 4/1985 | Desai et al. | 219/486 |
| 4,542,283 | 9/1985 | Leverenz | 219/486 |

FOREIGN PATENT DOCUMENTS 2102164  1/1983  United Kingdom ............ 219/308

Primary Examiner—M. H. Paschall
Attorney, Agent, or Firm—Ostrolenk, Faber, Gerb & Soffen

[57] ABSTRACT

An electric power control device is composed of plural resistor loads ($1_0$–$1_4$) the heat-generating powers of which are different from one another, switch means ($3_0$–$3_4$) connected in series to each of the resistor loads and adapted for the ON-OFF control of an ac power (2), and means ($4_0$–$4_4$) for ON-OFF controlling the switch means so as to turn on or turn off the ac power and also for selectively controlling the individual resistor loads so as to adjust the heat-generating powers of all of the resistor loads in accordance with their corresponding desired heat-generating powers.

3 Claims, 3 Drawing Figures

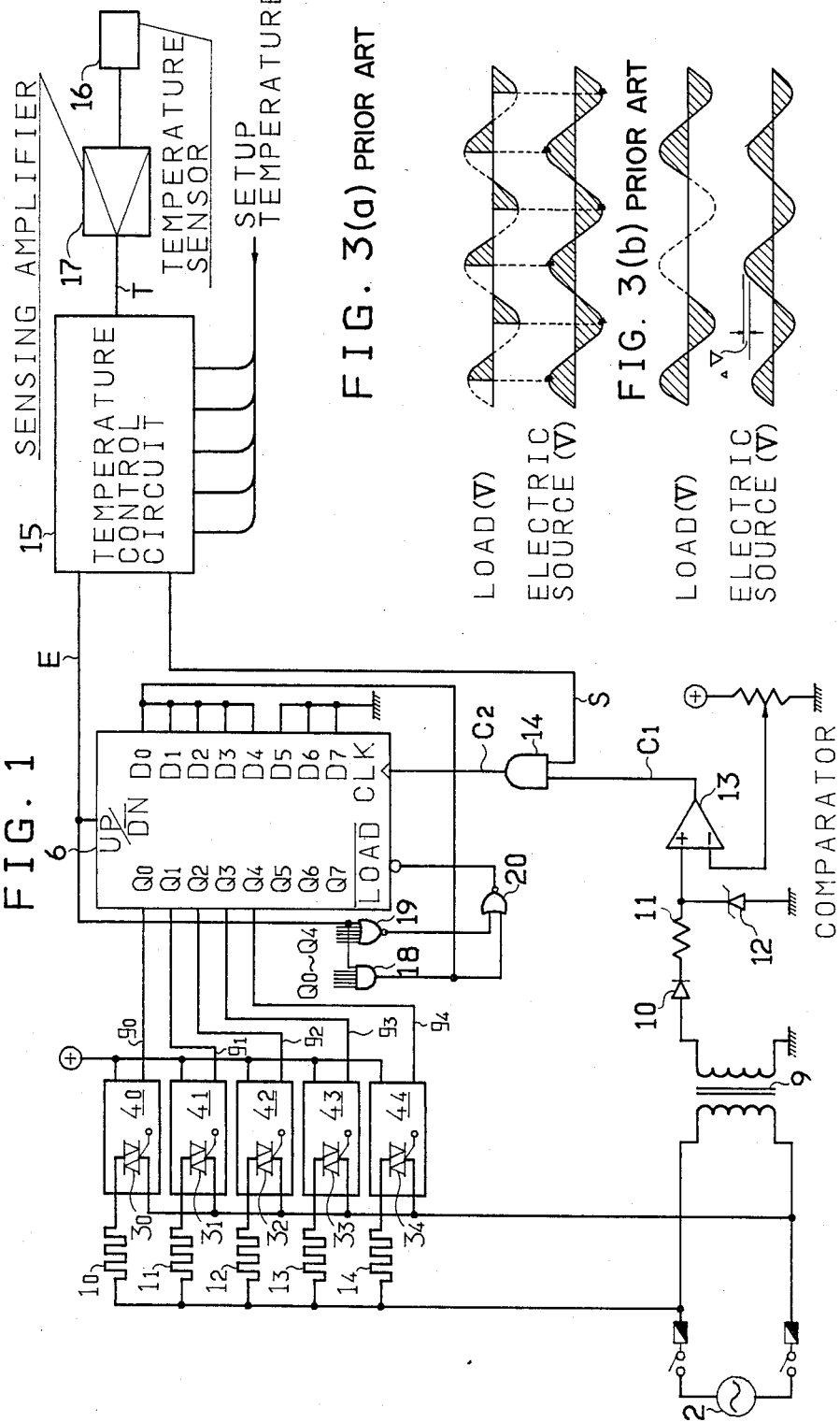

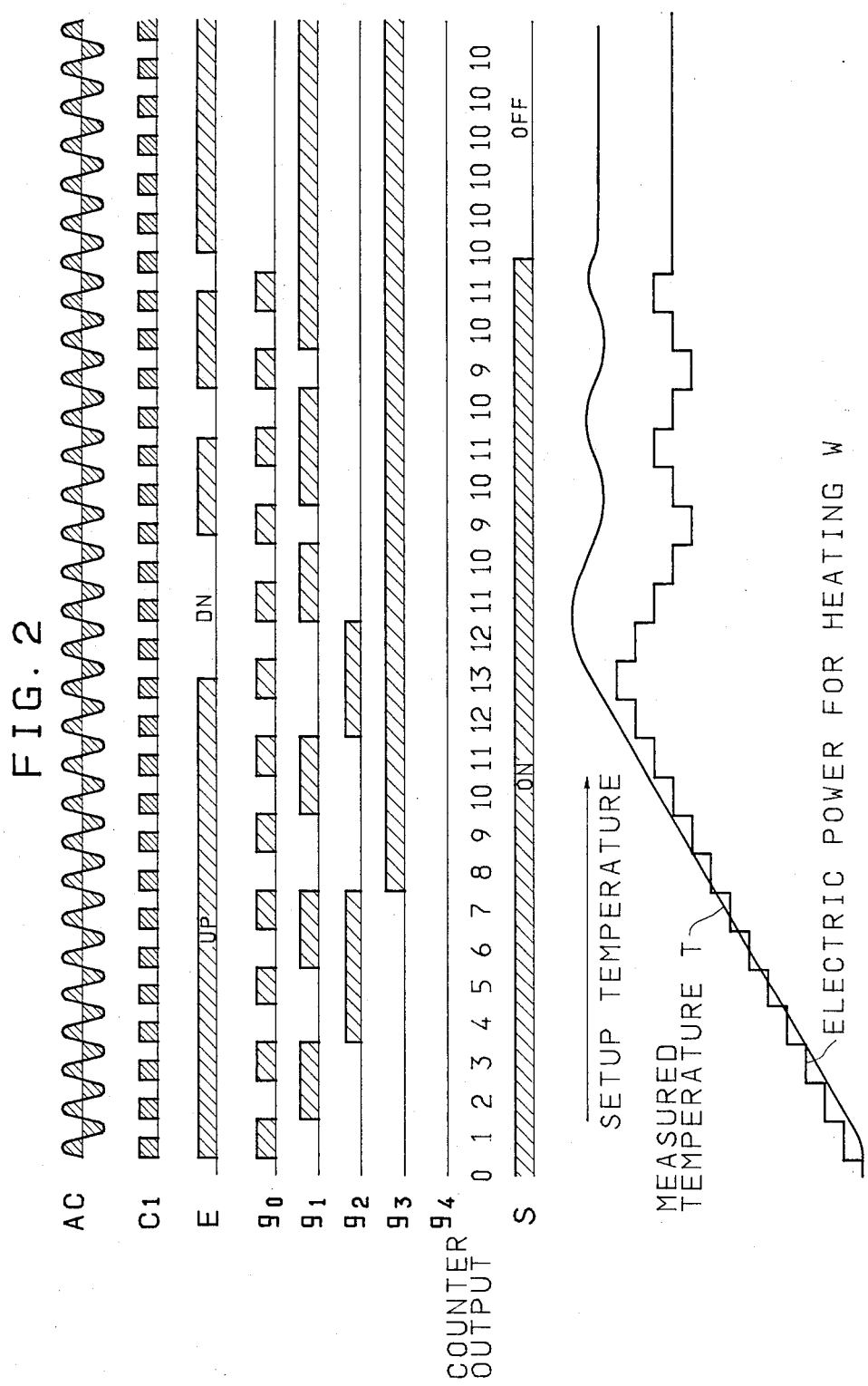

ELECTRIC POWER CONTROL DEVICE IN AN AUTOMATIC TEMPERATURE ADJUSTING APPARATUS

BACKGROUND OF THE INVENTION

This invention relates to an electric power control device for loads of resistance heating elements in an automatic temperature regulator or the like.

Conventional electric power control devices employed for commercial power sources and making use of semiconductor switches generate high-frequency noises or cause fluctuations in voltage on power source lines, since they turn on or off relatively large powers.

When a heater load is ON-OFF controlled in a control operation in which the regulation of temperature is required, the maximum heat quantity is produced while the heater is kept on. For this reason, mere ON-OFF control is unable to meet the demand for fine adjustment of heat to be generated.

One possible method for achieving fine adjustment of the quantity of produced heat is to control the heater operation by firing thyristors. Although this method is effective for achieving fine adjustment in the regulation of temperature, high-frequency noises are produced resulting in deleterious effects to radio receivers and T.V. receivers. This noise is the result of the abrupt rise of current upon firing as illustrated in FIG. 3($a$) which illustrates the waveform of a terminal voltage of a load and the waveform of a voltage on the corresponding power source line in the conventional electric power control method.

Alternatively, the ON-OFF control of a heater may be effected at the instant that the ac supply voltage passes through zero. This method makes it possible to perform the ON-OFF control more frequently without generating high-frequency noises.

FIG. 3($b$) illustrates the waveform of a terminal voltage of a load and the waveform of a voltage on the corresponding power source line in the conventional electric power control method. As shown in FIG. 3($b$) the ON-OFF control of the shortest ON time of which is set equal to a single cycle of the voltage of an ac power source causes a large current to flow in the circuit upon turning on and off the electric power, thereby producing an abrupt voltage change ($\Delta V$) on the power source line and hence leading to such a drawback that fluorescent lamps are caused to flicker.

BRIEF DESCRIPTION OF THE INVENTION

An object of this invention is to solve the above-mentioned drawbacks and to provide an electric power control device which can perform the control of a constant on-load electric power by ON-OFF controlling without regard to the quantity of the constant on-load electric power, without producing any abrupt changes in voltage and current on causing high-frequency noises on the power source line, and without developing voltage fluctuations on the power source line.

In one form of this invention, there is provided an electric power control device comprising plural resistor loads ($1_0$–$1_4$) the heat-generating powers of which are different from one another, switch means ($3_0$–$3_4$) connected in series to each of the resistor loads and adapted for the ON-OFF control of an ac power (2), and means ($4_0$–$4_4$) for ON-OFF controlling the switch means so as to turn on or turn off the as power and also for selectively controlling the individual resistor loads so as to adjust the heat-generating powers of all of the resistor loads in accordance with their corresponding desired heat-generating powers.

Abrupt voltage fluctuations to the power source line can be reduced as much as possible by parallel-controlling plural heat-generating loads the heat-generating powers of which are different from one another in such a way that plural loads are suitably combined and used in parallel for a certain constant heat-generating power so as to maintain the power source line in a continuously-conductive state and changes in power supply required for fine adjustments are produced by effecting the change-over to such heat loads as producing small changes in heat-producing power in accordance with zero-cross ON-OFF control.

BRIEF DESCRIPTION OF THE DRAWINGS

The above and other objects, features and advantages of the present invention will become apparent from the following description and the appended claims, taken in conjunction with the accompanying drawings, in which:

FIG. 1 is an electrical circuit diagram showing one embodiment of this invention applied to a temperature regulator;

FIG. 2 is a time chart of signals at certain essential parts in the electrical circuit diagram of FIG. 1; and FIG. 3 are wave-form diagrams of terminal voltages of loads and voltages on their corresponding power source lines in conventional control of electric power.

DETAILED DESCRIPTION OF THE INVENTION

Referring first to FIGS. 1 and 2, a plurality of heaters $1_0$–$1_4$ the heat-generating powers of which are different from one to another, are provided. The respective heaters $1_0$–$1_4$ are connected in parallel to a commercial ac power source 2, through triacs $3_0$–$3_4$ connected in series with their corresponding heaters, via switches and fuses.

Although not illustrated in the drawing, the triacs $3_1$–$3_4$ can be switched on by their corresponding known zero-cross switch control circuits $4_0$–$4_4$ in accordance with an impressed voltage at the instants that the ac supply voltage passes through zero when input signals $g_0$–$g_4$ to the control circuits $4_0$–$4_4$ are at a high level [H].

The input signals $g_0$–$g_4$ are supplied respectively, from output terminals $Q_0$–$Q_4$ representing the lower five digits of the output of an up/down binary counter 6.

Clock signal $C_2$ for the binary counter 6 is derived from a voltage which has been fed from the ac power source 2 and subjected to half-wave rectification by the combination of a step-down transformer 9 and a diode 10. The rectified voltage is shaped in waveform by a current-limiting resistor 11, Zener diode 12 and comparator 12 and is then input through an AND gate 14.

A clock signal $C_1$ output from the comparator 13 is input to the AND gate 14 and at the same time, a state-indicating signal S is input to the other input terminal of the AND gate 14 from a temperature control circuit 15. The state-indicating signal S takes an [H] level when temperature control is required and an [L] level when the controlled temperature has fallen in a stable state.

When the state-indicating signal S is at the [H] level, the clock signal $C_2$ is input to the clock input terminal CLK of the binary counter 6 after passing through an AND gate 14.

A temperature signal T is to input the temperature control circuit 15 via a sense amplifier 17 from a temperature sensor 16 provided at a desired temperature-measuring location. The temperature signal T is then compared with a preset temperature which has been chosen suitably. The result of the comparison is fed as a temperature-discriminating signal E to the up/down terminal UP/DN of the binary counter 6.

The temperature-discriminating signal E takes an [H] level when the temperature signal T is lower than the preset temperature and an [L] level when the temperature signal T is higher than the preset temperature. The temperature-discriminating signal E is input to the binary counter 6.

The heat-generating powers of the individual heaters $1_0$–$1_4$, which correspond respectively to the output terminals $Q_0$–$Q_4$ for the respective signals of the binary counter 6, are $2^n$ (n=0, 1, 2, 3, 4) multiples of the heat-generating power for the lowest digit.

Supposing that the heater $1_0$ controlled by the input signal $g_0$ from the lowest-digit output $Q_0$ is for example of 10 W, the heater $1_1$ corresponding to the digit output terminal $Q_1$, the heater $1_2$ corresponding to the digit output terminal $Q_2$, the heater $1_3$ corresponding to the digit output terminal $Q_3$ and the heater $1_4$ corresponding to the digit output terminal $Q_4$ are designed to be of 20 W, 40 W, 80 W and 160 W successively.

The heaters employed preferably use a material whose resistance is stable over a wide range of temperatures. It is possible to use, for example, a heating material "KANTHAL" (trade name of KANTHAL ELECTRO HEAT AB, Sweden) the resistance of which remains substantially constant from room temperature to about 1,800° C.

FIG. 2 shows the transitional state of the temperature controlled by the above-constructed electric power control device of the present embodiment from a time point immediately after the closure of the power source switch until another time point at which the controlled temperature has reached a steady state.

Namely, while counting in an ascending order every cycle of the power source voltage AC when the temperature-discriminating signals E are at the [H] level, the binary counter 6 changes the overall heat-generating power W of the respective heaters $1_0$–$1_4$ in accordance with its counted value.

In the above operation, the power increment is 10 W per cycle.

When the temperature has risen to a preset temperature, the temperature-discriminating signal E is reversed to [L] and the binary counter 6 thus counts cycle by cycle in a descending order to decrease the heat-generating power W.

This power decrement is also 10 W per cycle.

The thus-controlled temperature exceeds the preset temperature slightly and after passing through a transitional period, it reaches a steady period. At this time, the state-indicating signal S outputs at an [L] level which indicates that a steady state has been attained, thereby stopping the clock $C_2$ of the binary counter 6.

The binary counter 6 retains the count at the time that the clock $C_2$ is stopped. Further, the individual heaters $1_0$–$1_4$ are controlled to remain ON or OFF depending on the outputs $Q_0$–$Q_4$ of the corresponding digits at the above time point.

When a temperature control is needed subsequent to the steady period, the state-indicating signal S is changed to [H]. The increment or decrement of the heat-generating power due to a temperature increase or decrease is 10 W per cycle. Since the heat-generating power is changed always with a mild increment or decrement only, no large voltage fluctuations are caused to occur on the power source line.

When the binary counter 6 counts in the ascending order until the outputs from the terminals $Q_0$–$Q_4$ of the binary counter 6 are all at the [H] level in the embodiment illustrated in FIG. 1, the outputs from the terminals $Q_0$–$Q_4$ would normally change to the [L] level in response to the next clock signal. This means that the heat-generating power changes, for example, from 310 W to 0 W. To avoid this undesired result, gate circuits 18,20 are provided to hold all the outputs from the terminals $Q_0$–$Q_4$ at the [H] level (in other words, the advance from 310 W to 310 W) even when the counter 6 counts in the ascending order while the outputs from the terminals $Q_0$–$Q_4$ are all at the [H] level.

When the counter 6 starts counting in the descending order while the outputs from the terminals $Q_0$–$Q_4$ are all at the [H] level, the outputs from the terminals $Q_0$–$Q_4$ would normally change to the [H] level in response to the next clock signal. This means that the heat-generating power changes, for example, from 0 W to 310 W. To avoid this problem, gate circuits 19,20 are provided in order to hold all the outputs from the terminals $Q_0$–$Q_4$ at the [L] level (in other words, to advance from 0 W to 0 W) even when the counter 6 counts in the descending order while the outputs from the terminals $Q_0$–$Q_4$ are all at the [L] level.

The counter clock $C_1$ obtained from the power source in the present embodiment. It may however be obtained from the output of a known oscillator. In this case, the unit time can be set longer or shorter than the cycle of the present embodiment.

The heaters may each be constructed of plural heater elements. The thus-constructed heaters may then be used in parallel (for example, 10 W×2=20 W, 10 W×40 W, ..., 10 W×16=160 W). In this embodiment, the heater elements can be arranged in a distributed fashion and the temperature distribution can hence be rendered more uniform.

In the above embodiment, the loads are heating elements, namely, heaters. The present invention can also be applied to adjust the light quantities of incandescent lamps by always causing small currents to flow and thus reducing rush currents.

As has been described above, the application of this invention to automatic control for increasing or decreasing the heat-generating power can always maintain the degrees of changes of the electric power below a prescribed level no matter whether the heat-generating power is controlled in an increasing or decreasing way. The present invention can therefore control the electric power while minimizing the voltage fluctuation on a power source line and avoiding occurrence of high-frequency noises.

Having now fully described the invention, it will be apparent to one of ordinary skill in the art that many changes and modifications can be made thereto without departing from the spirit or scope of the invention as set forth herein.

I claim:

1. An electronic power control device, comprising:

a plurality of resistive loads the heat-generating powers of which vary from one another by successive integer exponential powers of a preselected number;

a plurality of switch means each connected in series to a different one of said resistive loads and adapted for ON-OFF control of AC power to said load; and means for ON-OFF controlling the switch means to turn on or turn off the AC power and also, whenever change in power to said resistive loads is desired, for controlling the individual resistive loads to adjust the collective heat-generating power of said resistive loads in a stepwise manner by stepping said power up or down by a constant value.

2. An electric power control device as claimed in claim 1, wherein said controlling means comprises a binary counter having a plurality of binary outputs, each of said binary ouputs being coupled to a resistive one of said resistive layers.

3. An electronic power control device, comprising:

a plurality of resistive loads the heat-generating powers of which vary from one another by successive integer exponential powers of 2;

a plurality of switch means each connected in series to a different one of said resistive loads and adapted for ON-OFF control to AC power to said load; and means for ON-OFF controlling the switch means to turn on or turn off the AC power and also, whenever change in power to said resistive loads is desired, for controlling the individual resistive loads to adjust the collective heat-generating powers of said resistive loads in a stepwise manner by stepping said power up or down by a constant value; said means for ON-OFF controlling the switch means including a binary counter with a plurality of outputs of successive integer exponential powers of 2, each of said outputs connected to a corresponding one of said resistive loads via a respective one of said switch means.

* * * * *